United States Patent [19]

Behrens et al.

[11] Patent Number: 4,555,585

[45] Date of Patent: Nov. 26, 1985

[54] FOLDABLE SOLAR CELL PANEL APPARATUS

[75] Inventors: Günter Behrens, Hamburg; Walter Schmitz, Wedel; Peter Kitzer, Hamburg; Dieter Rüsch, Wedel, all of Fed. Rep. of Germany

[73] Assignee: Licentia Patent Verwaltungs-GmbH, Frankfurt am Main, Fed. Rep. of Germany

[21] Appl. No.: 607,879

[22] Filed: May 7, 1984

[30] Foreign Application Priority Data

May 7, 1983 [DE] Fed. Rep. of Germany ....... 3316789

[51] Int. Cl.$^4$ ............................................. H01L 31/04
[52] U.S. Cl. ..................................... 136/245; 244/173
[58] Field of Search ................ 136/245, 292; 244/173; 160/199, 206, 213; 52/71

[56] References Cited

U.S. PATENT DOCUMENTS 4,015,653 4/1977 Slysh et al. .......................... 160/213
4,151,872 5/1979 Slysh et al. .......................... 160/213

OTHER PUBLICATIONS

R. V. Elms, Jr., "Family of Solar Array Design Options", *Conf. Record*, 13th *IEEE Photovoltaic Specialists Conf.*, (1978), pp. 208–214.

G. M. Jones et al., "Small Space Station Electrical Power System Design Concepts", 11th *Intersociety Energy Conversion Eng. Conf.*, (1976), pp. 1443–1448.

*Primary Examiner*—Aaron Weisstuch
*Attorney, Agent, or Firm*—Spencer & Frank

[57] ABSTRACT

A foldable solar cell panel apparatus has at least two panel portions which are connected together at a foldable edge to form at least one foldable pair which, in the folded-together state, is preferably stored in a panel container. A stationary folding and unfolding system brings the solar cell panel into the folded or unfolded state. During the folding process, the lowermost deployed foldable pair is folded together while the foldable pairs above it remain unfolded. The deployed foldable pairs are folded together individually in succession. During the unfolding process, the uppermost foldable pair stored in the panel container is unfolded while the fold pairs below it are held in the folded state. The stored foldable pairs are unfolded in succession during deployment.

9 Claims, 12 Drawing Figures (released state)

(tensioned state)

FOLDABLE SOLAR CELL PANEL APPARATUS

BACKGROUND OF THE INVENTION

The present invention relates to a foldable solar cell panel apparatus having at least two panel portions that are connected in an accordion-like manner along a foldable edge, with a folding and unfolding system being provided to withdraw the panel from a panel container for deployment and to fold the panel back into the container for storage.

It is generally known that the solar cell generators for spacecraft are launched into space in a folded, rolled, or similar compact state. The generators are spread only after they are in space. Moreover, future spacecraft are expected to employ reusable, foldable solar generators for their energy supply. The large dimensions of such solar generators, in addition to their required foldability, raise serious problems regarding the dynamic behavior of generator panels (i.e. the part of the generator equipped with the solar cells) during the folding processes. Control of the refolding process is the central aim of the invention—by its very nature; thus, its advantages are apparent mainly for many foldable couples. If only one foldable couple is present, controlled refolding is by itself guaranteed.

SUMMARY OF THE INVENTION

It is the object of the present invention to provide a foldable solar cell generator panel apparatus having at least two panel portions which are connected together along a foldable edge to form a foldable pair, so that controllable folding or unfolding is made possible in space as well as during tests on earth.

This object can be accomplished according to the present invention by providing a solar cell array on a panel having at least two portions that are joined along a foldable edge to form a foldable pair which is stored before deployment in a panel container. A folding and unfolding system unfolds the panel for deployment by unfolding the foldable pairs one at a time, with the uppermost pair in the panel container being unfolded while the foldable pairs beneath it are retained in the container in their folded state. The folding and unfolding system also returns the deployed panel portions to the container in succession, with the lowermost deployed foldable pair being folded back into the container while the foldable pairs above it remain in their unfolded state.

In accordance with one aspect of the invention, the uppermost panel portion is mechanically connected via an end plate to a movable part of the folding and unfolding system and the lowermost panel portion is mechanically connected to the panel container. The folding and unfolding system includes at least two cables which are laced through the panel portions, each cable having one end secured to the end plate and the other end wound onto a spring drum disposed below the lowermost panel portion. During the folding process the cables are releasably fastened to the foldable pairs in order to successively fold the pairs into the panel container, and a holding mechanism prevents the unfolding of the foldable pairs to retain them in the container. During the unfolding process the holding mechanism also serves to prevent fanning of the foldable pairs.

In accordance with another aspect of the invention, each cable passes through passage openings, provided in the immediate vicinity of a foldble edge connecting two adjacent foldable pairs of panel portions, in such a manner that the cables extend primarily along the back of the panel. The cables extend along the front of the panel only in the region of the foldable edge between the passage openings.

In accordance with another aspect of the invention, the releasably fastened connection between a cable and the foldable pairs of the panel is provided by fastening balls to the cable and by shaping one of the passage openings in each foldable pair in keyhole configuration, with the elongated portion of the keyhole opening being oriented away from the adjacent foldable edge and with the circular portion of the keyhole opening being dimensioned to permit passage of the balls. The other passage opening in the foldable pair for the cable is an elongated opening through which the balls can pass. The number of balls on each cable corresponds to the number of foldable pairs of panel portions. The balls are spaced apart from each other in a staggered fashion in such a manner that, when the panel is deployed, the balls are offset by a given amount and come to rest before the corresponding keyhole openings.

In accordance with yet another aspect of the invention, the holding mechanism of the folding and unfolding system includes a gear system disposed along each of the two longitudinal sides of the panel container. The gears of the system are positioned so that the gear teeth can engage pins that are disposed along the foldable edges of the panel and surrounded by recesses. One of the gear systems is provided to prevent unfolding of the foldable pairs of panel portions, and during the folding process the gears of this gear system rotate in a direction which prevents the unfolding of pairs that have been folded into the container. These gears rotate passively in the opposite direction during the unfolding process so that individual foldable pairs are unfolded in succession. The other gear system is provided to prevent the foldable pairs from fanning out. During the folding process the gears of this system rotate in a direction which prevents fanning of the foldable pairs of panel portions, and during the unfolding process these gears are rotated passively in the opposite direction to assure release of the foldable pairs.

In accordance with still another aspect of the invention, the cables are fastened to the end plate by a leader which is released to permit the lowermost ball to move to a position for releasably fastening the lowermost foldable pair.

The advantages of the present invention are essentially the simplicity of the cable system and the associated passive elements in the sheet. The tension in the cables is supplied by spring drums, and therefore does not require any kind of additional energy. A further advantage is that no synchronization of the device with the folding/unfolding system is necessary.

DESCRIPTION OF A PREFERRED EMBODIMENT

Figure 1:
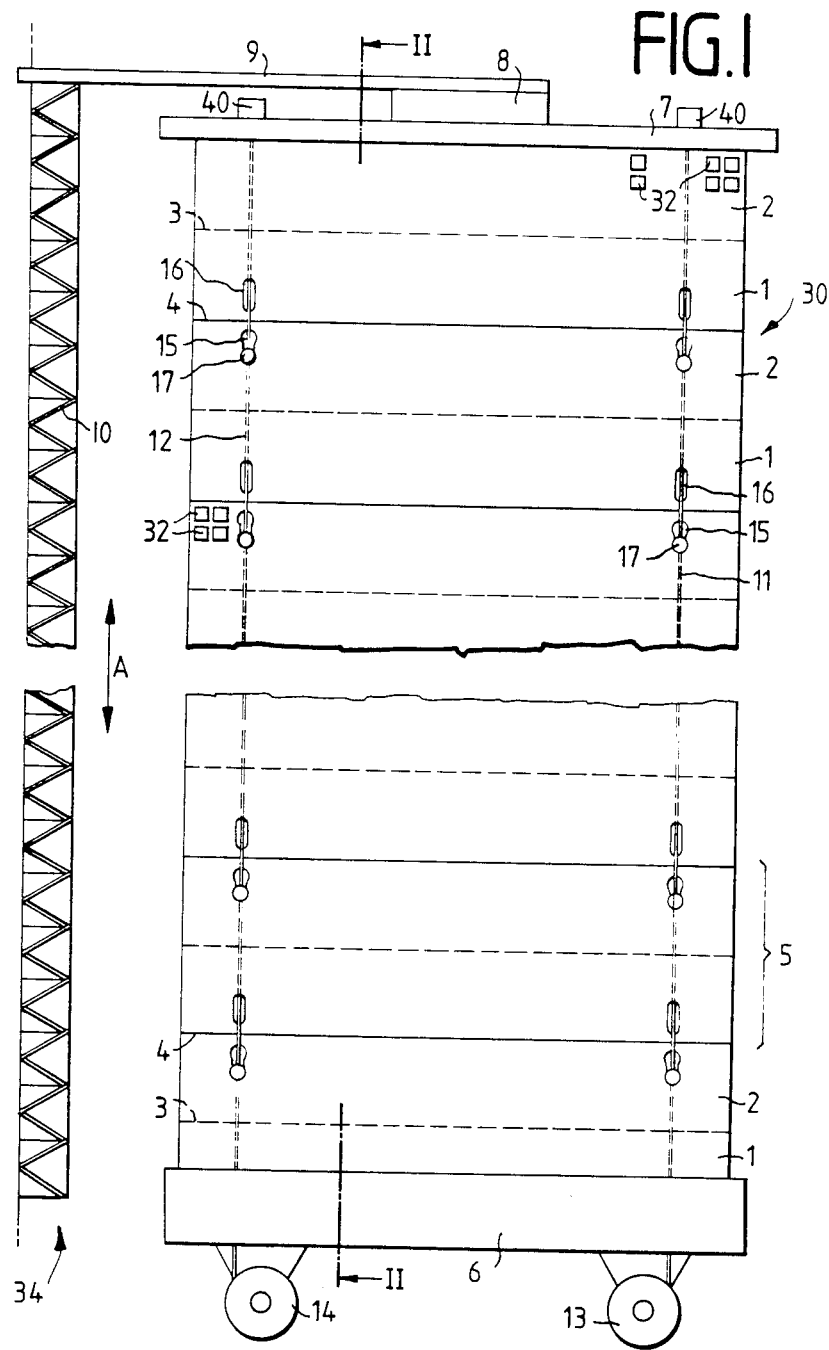
FIG. 1 is a front elevational view schematically illustrating a deployed solar cell panel that has been unfolded from a panel container by a folding and unfolding system.

In FIG. 1, a solar cell generator panel 30 has a plurality of panel portions 1 and 2 which are equipped with solar cells 32 (only a few of which are illustrated) on their front faces and which are mechanically and electrically interconnected at foldable edges 3 and 4. Two adjacent panel portions 1 and 2, which are joined at a foldable edge 3 (illustrated with dashed lines), form a "foldable pair" 5. Two adjacent foldable pairs 5 are joined at a foldable edge 4 (illustrated with solid lines). It will be apparent that panel 30 is an accordion-like structure, with the panel portions being disposed substantially parallel to one another in a stack when the accordion is collapsed and with the panel portions being substantially co-planar when the accordion is stretched out to deploy panel 30. In the collapsed state, the foldable edges 4 joining the foldable pairs 5 are disposed in a column, and the foldable edges 3 joining the panel portions 1 and 2 of individual foldable pairs 5 are disposed in a separate column.

With continuing reference to FIG. 1, the lowermost panel portion 1 of the lowermost foldable pair 5 is mechanicaly connected with a panel container 6, which serves to accommodate panel 30 when it is folded for storage. The uppermost panel portion 2 of the uppermost foldable pair 5 is fastened to an end plate 7 which, when the panel 30 is folded together, provides a cover plate for container 6. The upper face of end plate 7 is fastened, by means of a schematically illustrated mechanical fastening elements 8 and 9, to the movable mast 10 of a stationary folding and unfolding system 34, which is not shown in detail in the drawing. Mast 10 can be extended or contracted as illustrated by arrow A. The folding and unfolding of the panel 30 is effected by a relative movement between movable mast 10 and container 6, which is also stationary.

In addition to mast 10, the folding and unfolding system 34 inclues a cable system having two cables 11 and 12. The top ends of lines 11 and 12 are mechanically secured to end plate 7, while the bottom ends are wound on spring drums 13 and 14, which are biased for rotation by springs (not illustrated). Spring drums 13 and 14 are disposed below the lowermost sheet portion 1 of the lowermost foldable pair 5, and are preferably mechanically fastened to container 6. The mechanical connection between lines 11 and 12 and end plate 7 is effected by means of a leader, which will be discussed in greater detail below.

During the folding process system 34 folds the lowermost foldable pair 5, while the foldable pairs 5 above this lowermost pair 5 remain unfolded. Thus all foldable pairs 5 are individually folded together in succession and are deposited in the folded-together state in panel container 6. During the unfolding process mast 10 is extended, and the uppermost foldable pair 5 is unfolded while the foldable pairs 5 below this uppermost pair 5 remain in the folded-together state. All foldable pairs 5 are thus unfolded successively. To permit this sequential folding and unfolding, a releasably fastened connection is provided between cables 11 and 12 and the lowermost foldable pair 5 when panel 30 is being folded into container 6 for storage. A holding mechanism is also provided which, during the folding process, prevents the unfolding of the foldable pairs 5 that have already been folded into container 6. During the unfolding or deployment process the holding mechanism also prevents a plurality of foldable pairs from unfolding and/or fanning out simultaneously. The releasably fastened connections and the holding mechanism will be described in detail in the following paragraphs.

Figure 2:
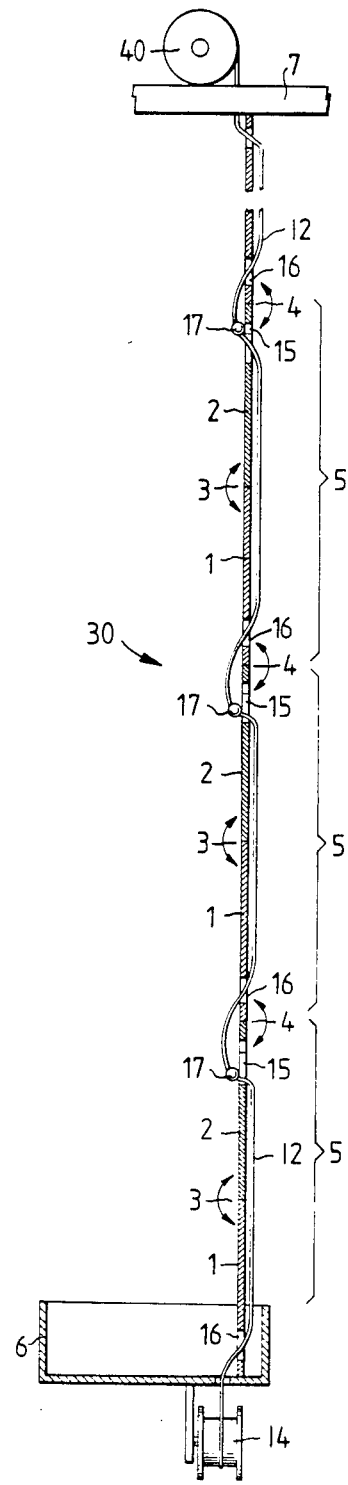
FIG. 2 is a schematic view, taken along the line II—II of FIG. 1, illustrating a cable laced through deployed panel portions.
Figure 3A:
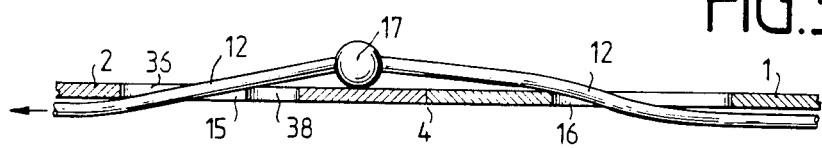
FIG. 3A is a sectional view corresponding to a portion of FIG. 2 and illustrates a ball positioned to be moved toward a corresponding keyhole-shaped opening to releasably fasten a foldable pair of panel portions to the cable.
Figure 3B:
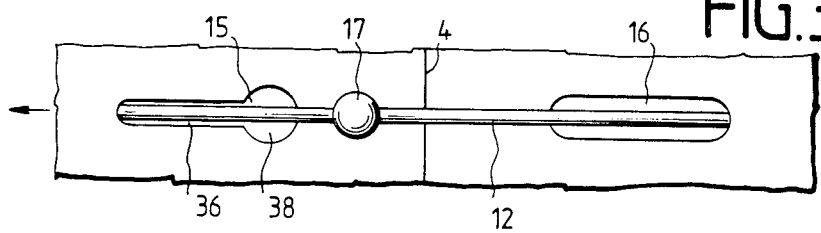
FIG. 3B schematically illustrates a front elevational view of the cable and ball positioned as shown in FIG. 3A.

As can be seen in FIG. 2, panel portions 1 and 2 of each foldable pair are provided, in the immediate vicinity of the foldable edge 4 between adjacent foldable pairs 5, with passage openings 15 and 16 through which the cables extend. For the sake of simplicity only cable 12 is illustrated in FIG. 2, but it will be understood that the configuration and operation of both cables are identical. Cable 12 passes through passage openings 15 and 16 in such a manner that the cable extends for the major part on the rear side of panel 30, that is, on the side facing away from the solar cells. In the region of the foldable edges 4 between two adjacent foldable pairs 5, however, cable 12 lies on the front faces of panel portions 1 and 2. The passage opening 15 for cable 12 is provided in the foldable portion 2 of each foldable pair 5, and cable 12 passes from the front of panel 30 to the back through opening 15. Openings 15 are shaped like keyholes, with the elongate portions 36 (see FIG. 3B) of these openings 15 being oriented away from the associated foldable edges 4, and with the circular portions 38 (see FIG. 3B) being dimensioned in such a way that balls 17, which are fastened mechanically to cable 12, can pass through unimpededly. The passage openings 16 for cable 12 are provided in the foldable portion 1 of each foldable pair 5, and cable 12 passes from the rear of panel 30 to the front through openings 16. The openings 16 have an elongate shape and balls 17 can pass through without obstruction. The shapes of passage openings 15 and 16, respectively, as well as their positions with respect to the foldable edges 4, can be seen in FIGS. 3A-3D.

It will be apparent from the foregoing discussion that, for each cable, each foldable pair 5 includes a passage opening 15 in the top panel portion 2 adjacent the opening 16 of the next higher foldable pair 5 and a passage opening 16 in the bottom panel portion 1 adjacent the opening 15 in the next lower foldable pair 5 when panel 30 is in its deployed state as illustrated in FIG. 2.

With continuing reference to FIG. 2, cable 12 (and, of course, cable 11) is provided with a plurality of balls 17 corresponding in number to the number of foldable pairs 5 in the solar cell generator panel 30. Balls 17 are arranged in a staggered fashion on cable 12 in such a manner that, in the unfolded state of the solar cell generator panel 30, they are offset upwardly by a staggered distance so that they come to lie in front of their associated keyhole openings 15. That is to say, the balls 17 are spaced equal distances apart along the cable but this spacing distance is greater than the distance between two successive keyhole passage openings 15 when panel 30 is in its deployed state, so that there is a degree of slack in the cable between the successive balls 17 even when the lowermost of the successive balls is disposed at the bottom of portion 36 of its corresponding opening 15. Due to this slack two balls 17 cannot simultaneously engage in two different keyhole-shaped openings 15 and consequently cannot simultaneously produce a releasably fastened connection between cable 12 and two foldable pairs 5.

Figure 3C:
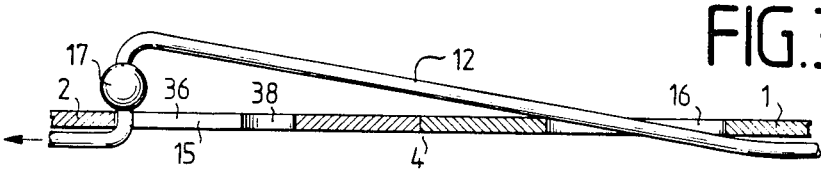
FIG. 3C is a sectional view corresponding to FIG. 3A after the cable has pulled the ball to the bottom of the keyhold-shaped opening.
Figure 3D:
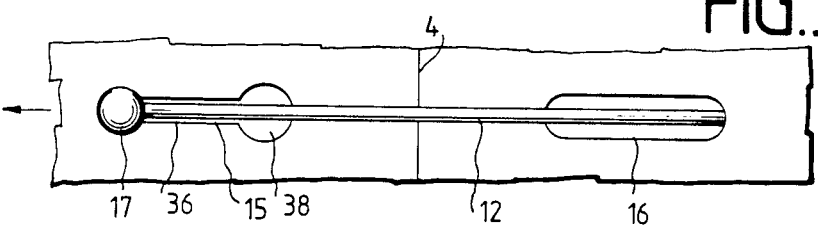
FIG. 3D schematically illustrates a front elevational view of the cable and ball positioned as shown in FIG. 3C.

FIGS. 3A–3D show how a releasably fastened connection can be realized between a foldable pair 5, i.e., between a foldable portion 2 and ball 17 on cable 12. If cable 12 together with ball 17 is pulled from its starting position (FIGS. 3A and 3B) in the direction of the arrow in the drawings (i.e. in the direction of panel container 6 in FIGS. 1 and 2), ball 17 does not pass through the circular portion 38 of the keyhole opening 15, but instead slides over the long portion 36 of this opening 15 into the end position (FIGS. 3C and 3D). If cable 12 is pulled further in the same direction, a force is exerted on panel portion 2 which causes the foldable pair 5 which includes the panel portion 2 illustrated in FIGS. 3A–3D to be folded together toward the sheet container. The force continues to act until the foldable pair 5 is in the container in the folded-together form. Only then does the force transmitting ball 17 pass through the circular portion 38 of keyhole passage opening 15, whereupon the cable 12 is wound onto spring drum 14. The subsequent foldable pairs 5 can then be folded together successively in the same manner with the aid of their associated balls 17.

Figure 4:
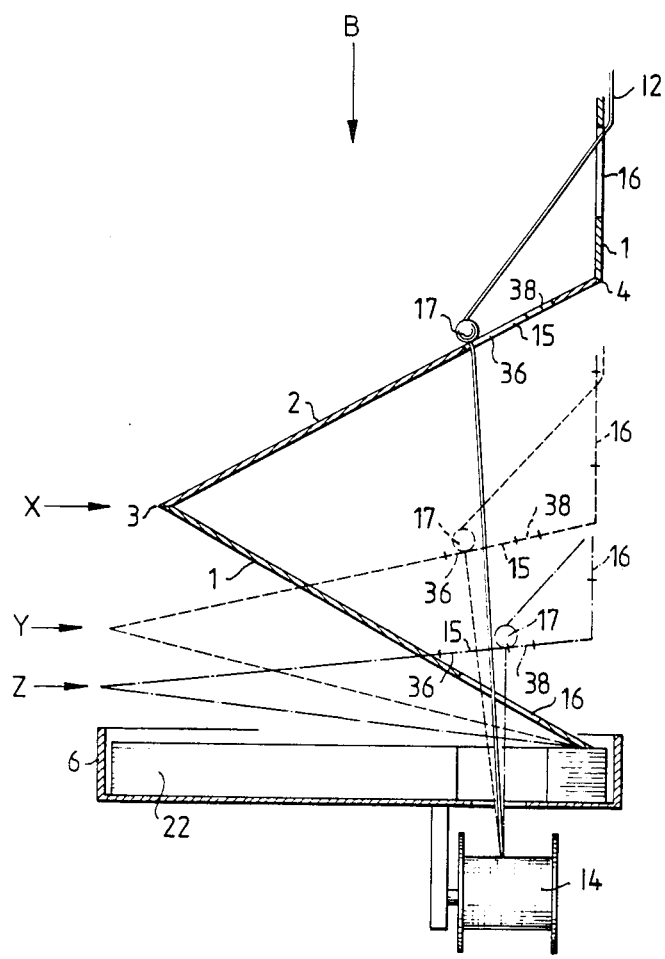
FIG. 4 is a sectional view schematically illustrating three positions of a single foldable pair of panel portions as the foldable pair is folded into the panel container.
Figure 5:
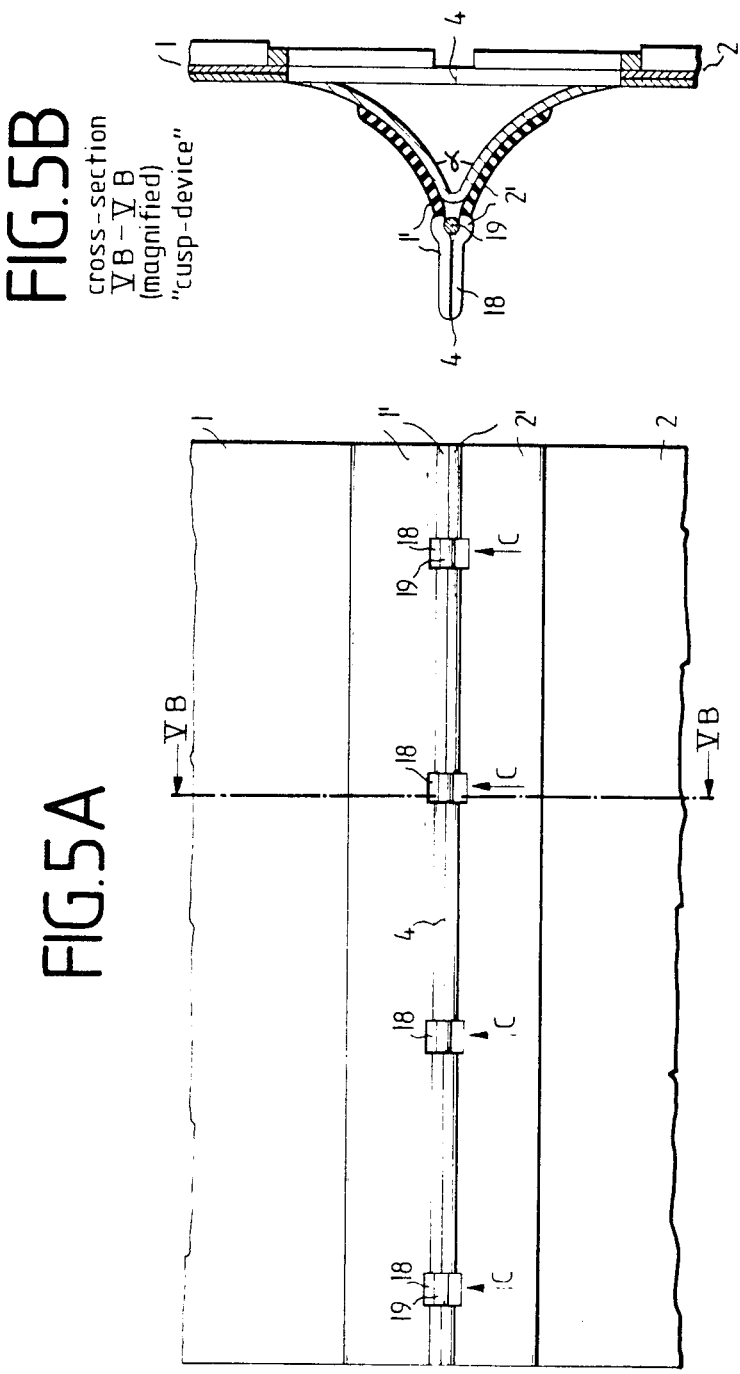
FIG. 5A schematically illustrates a cusp device with a pin that is along a foldable edge of a panel portion and exposed at four places.
FIG. 5B is a sectional view along the line VB—VB of FIG. 5A of the special cusp device about the foldable edge, with the incorporated pin.

The process of folding one foldable pair 5 is shown schematically in FIG. 5, which illustrates the lowermost pair 5 that is still deployed in three successive positions X, Y, and Z as it is being folded in the direction of arrow B into container 6. It will be apparent that position X is attained following the state illustrated in FIG. 3C. Comparing FIGS. 3C and 4, it should be noted that due to the position of spring drum 14 cable 12 initially pulls the ball 17 to the left with respect to FIG. 4 when the lowermost deployed pair is still in its fully extended state, as in FIG. 3C. The lowermost deployed pair 5 then begins folding along its foldable edge 3 and attains position X. At position X ball 17 is no longer pulled leftward by cable 12 but instead is pulled almost straight down toward spring drum 14. At position Y a rightward force is exerted on ball 17, which beings to slide toward circular portion 38 of keyhole opening 15. At position Z ball 17 is about ready to drop through portion 38, whereupon spring drum 14 takes up the slack to the next ball 17 so that the next ball begins exerting a leftward force on the next foldable pair 5. The reference numerals of FIGS. 1 through 3D are used for the individual components in FIG. 4. It can easily be seen how ball 17, with increasing progress of the folding process, is displaced in the direction toward the circular portion 38 of the keyhole-shaped passage opening 15 until, when the lowermost foldable pair 5 is folded together, it passes through the circular portion.

Cables 11 and 12 are connected to end plate 7 via a leader. Before a folding process is initiated for solar cell generator panel 30, a safety is released in end plate 7 to release the leader. This displaces cables 11 and 12 and their balls 17 toward the panel storage container 6. The displacement of the cables produces releasably fastened connections between the lowermost deployed foldable pair 5 and cables 11 and 12, whose respective first ball 17 rests on the front of the foldable pair and thus is able to transfer the tension from cables 11 and 12 to the foldable pair. Once the safety has been released, this releasably fastened connection is initially effected only in the lowermost deployed foldable pair of the panel 30, while the staggering in the arrangement of the balls 17 keeps all other points of intersection between "ball" and "keyhole-shaped" passage opening without tension. The releasably fastened connections between the staggered balls and their associated foldable pairs is effected only after the lowermost deployed foldable pair has been folded together.

There can be many realisations of a suitable "leader and safety" system for achieving the interaction leading to the ball-keyhole engagement for the lowermost foldable pair.

The particular solution might depend upon whether only one or repeated deployment/refolding cycles of the foldable solar generator in orbit are required.

For non-repetitive applications, the "leader" part of cable 12, which runs through an opening in the end plate 7 (compare FIGS. 7A and 7B) and which may have a length of several centimeters depending on panel dimensions and the corresponding cable slack/staggering or offset length, is moved up and fixed. This is done prior to launch. The device used for fixation can then be very simple (mechanical, combined with a spring or an inclined plane transferring potential energy to the cable in this state) and the fixation is released by simple pyrotechnical or electronic means (commonly used in space applications) prior to refolding. Renewed tensioning and upward movement of the "leader", then, is not possible because no active "safety" system is present.

For repeated action of the system, an active device is required, which is able to impose potential energy/tension on the leader system in its state prior to refolding. A second device is required for repeatable sudden release of the leader system just before retraction is about to begin. Again, several realisations are possible. For the tensioning device, actively driven drums (see below), rotating lever arms guiding the "leader" part of cable 12, or elliptical or eccentrically positioned disks can be installed on the end plate 7, which are coupled to springs which are tensioned in the states of the device when the "leader" is moved up and suddenly set free when refolding is planned to begin. This release can be achieved by a sudden torque on the installed drum at the end plate or by an impulse/pull on the cable 12 imposed by a lever below the sheet container, by an additional motor-driven drum, or by electronic release of a jack engaged by the said tensioning device or corresponding extra pulling cables, or cogwheel/jack engaging devices.

Figure 7A:
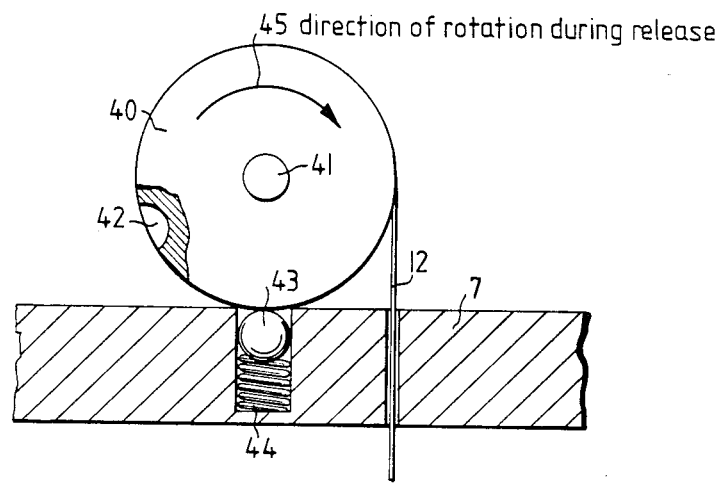
FIGS. 7A and 7B are schematic sectional views illustrating one example of a suitable mechanism operating the "leader and safety" system for repeated controlled refolding, this system responsible in particular for the engagement of the balls in corresponding key-holes for the lowermost foldable pair.
Figure 7B:
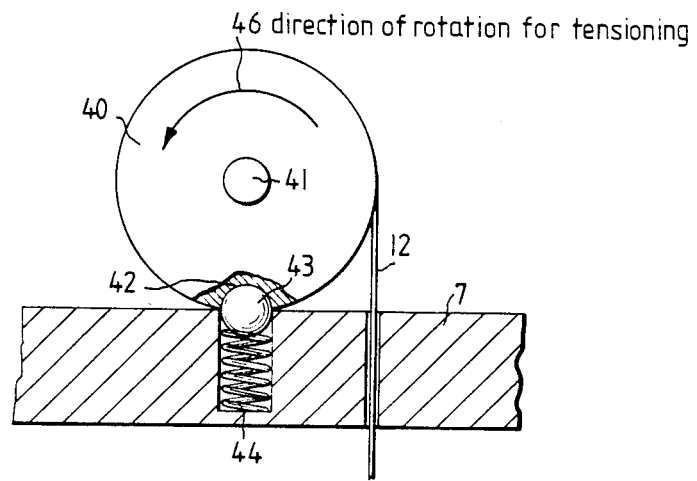

Most of the mentioned devices have the disadvantage of high complexity or incorporation of sensitive additional items, or result in a disadvantageously irregular motion for the cable and leader system. Others cancel the the advantageous continuous and constant tensioning acting from the basic spring drum 13. A particularly suitable example of a "leader and safety" mechanism is shown in FIGS. 7A and 7B.

The device is installed at the endplate 7 (see FIG. 2). In principle it consists of a drum 40 which can be actively driven in two directions; this is connected to a restoring (spiral) spring 41 incorporated internally of the drum (see FIGS. 7A and 7B). The "leader" part of cable 12 is led over the periphery of said drum 40 and connected to it after a length which is larger than the "leader" length by a few centimeters. As can be seen in FIGS. 7A and 7B, a spherical recess 42 is formed at the periphery of said driven drum 40, recess 42 corresponding to an engaging ball 43 sunk into the endplate 7. Ball 43 is in close contact with the drum 40 and is biassed by a spring 44 which is situated below it within a space drilled into the endplate 7.

By the action of a (electro-)motor, the drum 40 is driven in such a way that the cable 12 is drawn through the hole in the endplate 7, and the required leader length is moved up when the spring compressing ball 43 is engaged within the spherical recess 42 in the drum surface. Simultaneously, the restoring spring 41 is tensioned (state shown in FIG. 7B).

The release prior to refolding is achieved by a short impulse or drive of the drum 40 in the opposite direction, leading to disengagement of ball 43 and spherical recess 42. After this, the drive is disengaged and the sudden action of the restoring spring 41 incorporated in the drum leads to a sufficiently fast release of the "leader" and said engagement of the balls in the keyholes at the lowermost foldable pair (for the state of the mechanism, see FIG. 7A). This process corresponds to the transition of the states of the FIGS. 3A/3B to the states of the FIGS. 3C/3D, respectively.

The relative motion between a ball and foldable pair that has been described above with reference to this "starting" release for refolding the lowermost foldable pair is repeated for each subsequent pair, due to the cable motion after release of the engagement (and at that time, the only engagement) between a ball and the keyhole in the lowermost foldable pair at a given refolding state, and due to the staggering/slack on account of the offset of the balls on cable 12.

Once the whole panel is refolded and stored in the sheet container, the mechanism presented in FIGS. 7A and 7B will be moved for repeated action from its released state shown in FIG. 7A to its "tensioned leader" state shown in FIG. 7B by actively driving the drum. This state, again, is released shortly prior to refolding, after the panel had been deployed for a new active period. Thus, the whole process is totally reversible. The displacement of the spherical segment within the surface of the drum 40 with regard to the surface point in contact with the engaging ball 43 shown in the state of FIG. 7A corresponds to the required panel-dimension; that is, the specific length of the "leader" part of the cable 12.

Actuation of mast 10 of the folding and unfolding system 34 causes cables 11 and 12 to be wound onto their spring drums 13 and 14, respectively, so that the distance between the ball 17 that is releasably fastened to the lowermost deployed foldable pair 5 and panel container 6 is shortened, which inevitably leads to the foldable pair 5 disposed therebetween being folded together. During the process of folding this foldable pair 5, the changing direction of the cable tension causes ball 17 to be progressively moved toward the circular portion 38 of the passage 15. At a minimum opening angle for the foldable pair 5, the ball is released from its support. This again releases cables 11 and 12, which, due to release of the "safety", is able to be displaced to a greater extent so that the next ball 17 can be engaged (see FIG. 4).

This process is repeated until the entire panel 30 is stored. However, partial folding of the panel 30 is possible just as well; the unfolded portions remain entirely planar and can be tensioned further. During the unfolding process, the cable system has no function. However, the passages of the cables through the panel portions 1 and 2 permit unimpeded movement, i.e. movement without releasable fastening, between the cables and the panel portions 1 and 2.

FIG. 5A shows a panel portion 1 which is provided with a cusp device, as shown in FIG. 5B, which is bonded to the panel portion 1 and the portion 2.

Figure 6:
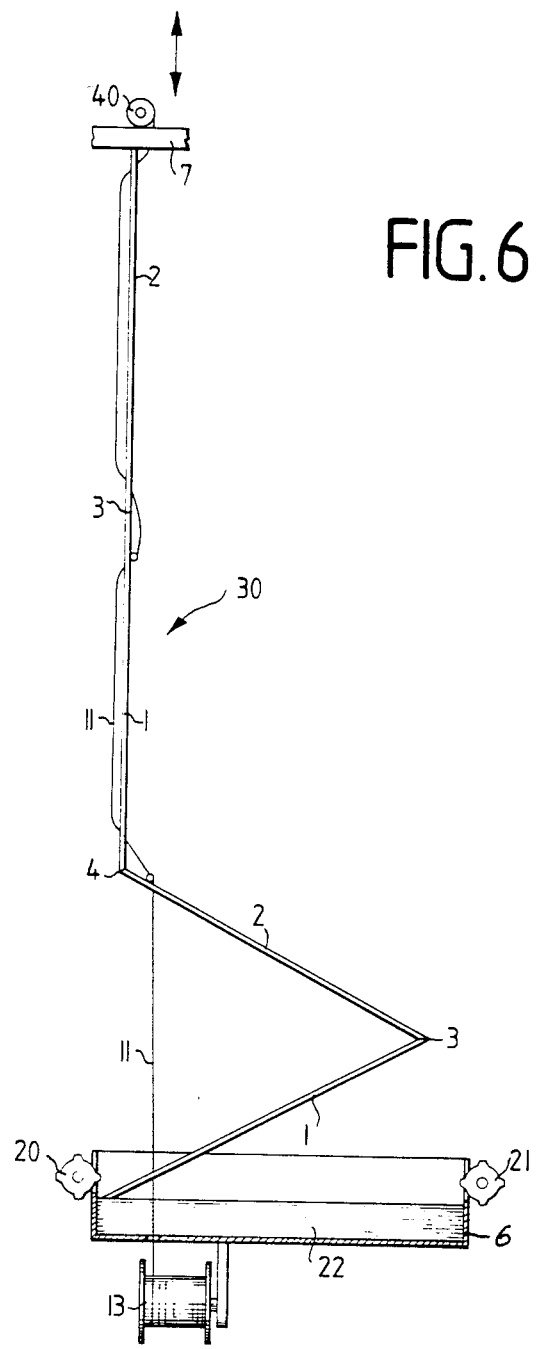
FIG. 6 is a sectional view schematically illustrating a gear system which cooperates with the pins of FIG. 5 as the panel portions are being deployed or returned to the panel container for storage.

The pin 19 runs continuously along the foldline and is incorporated within the cusp device, which has four recesses 18 so that the pin 19 is accessible to the gears system. The cusp device can act as additional help for refolding, as well as a folding direction security device, because for refolding about foldable edge 4, the device allows for closing but not opening the angle (see FIG. 5B). For such an application, spring properties might be provided by choosing particular metal and plastic composite materials for the cusp. Of course, many modifications of the materials and shapes are possible. Recesses 18 are provided with pins 19 inserted (see FIG. 5B) in foldable edges 3 and 4 which, together with gears 20 and 21 shown in FIG. 6, form the above-mentioned holding mechanism. For this purpose, the gaps between the teeth in the gears, which are parts of gear systems, come into engagement with pins 19 at given positions of panel portions 1 and 2. Arrows C in FIG. 5A indicate the direction of engagement of gears 20 with the pins 19 (during refolding and unfolding in the proximity of the sheet container 6—see FIG. 6). Gears 20 of the first gear system are driven, during the folding process, in a direction which prevents the unfolding of the foldable pairs 5 that are already in stack 22. During the unfolding process, a torque is applied in the opposite direction so that the gears are rotated in such a manner that the individual foldable pairs 5 are unfolded successively. Gears 21 of the second gear system are driven, during the folding process, in a direction which prevents fanning of the folded-together pairs 5 in stack 22. During the unfolding process, gears 21 are rotated in the opposite direction by a given torque so that release of foldable pairs 5 is assured.

The presented holding system involving gears 20 and 21 is an important factor with regard to the overall reliability of the controlled folding/deployment system because undesired unfolding/fanning out is of fatal consequences. Alternatives such as spring or lever arm systems are not only more complicated, but also introduce disadvantages with regard to safety. Safe panel motion during the refolding process, achieved by the continuous activity of gears 20 and 21 at that time, is especially important in the proximity of the container since the sudden release of the previously engaged balls can result in a bending or fanning out impulse on the panel portions via bending stresses imposed on the flexible panel parts during retraction, and since external forces are acting on the blanket. Such external forces include coupling of the sheet container to vibrations coming from the drive mechanism, commonly known disturbances resulting from discontinuous motion of the mast and, above all, vibrations transferred from reorientational motions of the spacecraft itself.

Even for large solar arrays, the sheet container will not exceed the height of a few centimeters. Thus, even a small resistance imposed on the panel portions already withdrawn during initiation of the unfolding process by the need to create a torque on the (now non-driven) gears 20 and 21 will suffice to achieve reliability with regard to deployment control. The remaining (very) small dislocations of panel portions not yet involved in the deployment process and still within the low container are allowable.

It will be understood that the above description of the present invention is susceptible to various modifications, changes and adaptations, and the same are intended to be comprehended within the meaning and range of equivalents of the appended claims.

What we claim is:

1. A foldable solar cell panel apparatus, comprising:
   a solar cell generator panel having a top end, a bottom end, and an axis running through said top and bottom ends, said solar cell generator panel having a plurality of panel portions which are connected at foldable edges that are substantially perpendicular to said axis to form a plurality of foldable pairs of panel portions, the panel portions of said plurality of foldable pairs being movable between a folded state and an unfolded state;
   a panel container disposed at said bottom end to store said foldable pairs when said foldable pairs are in their folded state; and
   folding and unfolding system means, connected to said solar cell generator panel and to said panel container, for folding into said container the lowermost of said foldable pairs that is not already in its folded sate in the container while any foldable pairs above said lowermost foldable pair remain in their unfolded state so that foldable pairs that are being folded into said container are folded individually in succession, and for unfolding from said container the uppermost of said plurality of foldable pairs that is not already in its unfolded state outside the container while any foldable pairs below said uppermost foldable pair remain in their folded state so that foldable pairs that are being unfolded from said container are unfolded individually in succession, said folding and unfolding system means including
      an end plate to which said top end of said solar cell generator panel is operationally connected,
      a mast mechanism movable along a line substantially parallel to said axis of said solar cell generator panel and operationally connected to said end plate,
      means for releasably fastening said plurality of foldable pairs of panel portions when said solar cell generator panel is being folded into said container, said means for releasably fastening including at least two cables each having a top end operationally secured to said end plate and a bottom end wound around a spring drum disposed below said bottom end of said solar cell generator panel, said means for releasably fastening providing releasably fastened connections between said cables and individual ones of said plurality of foldable pairs, and
      holding mechanism means operationally connected to said container for preventing the unfolding of foldable pairs already in said container when said lowermost of said plurality of foldable pairs that is not already in its folded state in the container is being folded into said container and for preventing simultaneous unfolding or fanning out of a plurality of foldable pairs when said uppermost of said plurality of foldable pairs that is not already in its unfolded state outside the container is being unfolded from said container.

2. The apparatus of claim 1, wherein said solar cell generator panel has a front side and a back side, and wherein for each of said cables the panel portions of each of said foldable pairs are provided with a pair of passage openings through which said cable passes in such a manner that when said foldable pairs are in their unfolded state the length of said cable disposed at the back side of said solar cell generator panel is greater than the length of said cable disposed at the front side, the cable extending on the front side in the region of the foldable edge between adjacent foldable pairs.

3. The apparatus of claim 2, wherein each passage opening corresponds to a foldable edge and wherein for each foldable pair of panel portions the passage openings through which said cables pass from the front to the back side of said solar cell generator panel as the cables progress toward the bottom end thereof have a generally keyhole shape with a generally circular portion and an elongated portion that is oriented away from the corresponding foldable edge, and wherein said folding and unfolding system means further comprises a plurality of balls that are fastened on the cables and that are dimensioned to pass through said generally circular portions.

4. The apparatus of claim 3, wherein for each foldable pair of panel portions the passage openings through which the cables pass from the back to the front side of said solar cell generator panel as the cables progress toward the bottom end thereof have an elongated shape.

5. The apparatus of claim 3, wherein for each cable the number of balls fastened thereto corresponds to the number of foldable pairs, the balls fastened to each cable having a staggered arrangement so that when all of the foldable pairs are in their unfolded state the balls are spaced apart by predetermined amounts and lie adjacent respective ones of said generally keyhole shaped openings.

6. The apparatus of claim 5, wherein said folding and unfolding means further comprises leader means for operationally connecting the cables to the end plate and means releasing said leader means for bringing a ball fastened on each cable into releasably fastened connection with the lowermost foldable pair that is not in its folded state in the container.

7. The apparatus of claim 1, further comprising a plurality of pins affixed to said solar cell generator panel at recesses therein adjacent the foldable edges, and wherein said holding device means comprises at least two gear systems means for engaging said pins and having gears with teeth, one gear system means being disposed at the back side of said solar cell generator panel adjacent said container and another gear system means being disposed at the front side of said solar cell generator panel adjacent said container, said one and another gear systems means being positioned so that the teeth of the gears come into engagement with the pins when the panel portions are disposed at a predetermined position with respect to the container.

8. The apparatus of claim 7, wherein said one gear system means comprises means for preventing the unfolding of foldable pairs that are already in their folded state in the container and includes means for rotating the gears of said one gear system means in a direction which prevents unfolding when the foldable pairs are being folded into the container and for rotating the gears of said one gear system means in the opposite direction so that the foldable pairs in the container are unfolded in succession when said foldable pairs are being unfolded from said container.

9. The apparatus of claim 7, wherein said another gear system means comprises means for preventing the fanning of foldable pairs that are already in their folded state in the container and includes means for rotating the gears of said another gear system means in a direction which prevents fanning when the foldable pairs are being folded into the container and for rotating the gears of said another gear system means in the opposite direction to release the foldable pairs when said foldable pairs are being unfolded from said container.

* * * * *